INVENTOR.
JOHN W. DRENNING
BY Oscar B. Brumback
his Attorney

March 26, 1968  J. W. DRENNING  3,374,500
APPARATUS FOR MAKING THIN WALL FOAMED POLYMERIC ARTICLES
Filed July 8, 1966  5 Sheets-Sheet 2

INVENTOR.
JOHN W. DRENNING
BY Oscar B Brumback
his Attorney

March 26, 1968  J. W. DRENNING  3,374,500
APPARATUS FOR MAKING THIN WALL FOAMED POLYMERIC ARTICLES
Filed July 8, 1966  5 Sheets-Sheet 3

INVENTOR.
JOHN W. DRENNING
BY
Oscar B Brumback
his Attorney

March 26, 1968  J. W. DRENNING  3,374,500
APPARATUS FOR MAKING THIN WALL FOAMED POLYMERIC ARTICLES
Filed July 8, 1966  5 Sheets-Sheet 5

INVENTOR.
JOHN W. DRENNING
BY Oscar B. Brumback
his Attorney

3,374,500
APPARATUS FOR MAKING THIN WALL FOAMED POLYMERIC ARTICLES
John W. Drenning, Baltimore, Md., assignor to Sinclair-Koppers Company, a partnership
Filed July 8, 1966, Ser. No. 563,869
8 Claims. (Cl. 18—5)

This invention relates to the molding of "thin wall" articles from expandable polymeric particles.

Conventionally, "thin wall" articles, such as cups, are made by heating expandable polymeric particles in a mold of suitable configuration. Usually the mold is comprised of a core element and mold cavity element. The core element nests inside the mold cavity element and the mold cavity element is substantially larger than the core element so that a peripheral area or space exists between the two elements. When foamed polymeric cups are being made, this space has, of course, the shape of a cup; and this space is charged or filled with expandable polymeric particles. Typical of suitable expandable particles are those expandable particles of polystyrene that are sold under the trademark Dylite and that contain a blowing agent which, when the particles are heated, causes the particles to expand. In commercial practice, steam is usually applied to the mold to heat the beads. The particles expand under the influence of heat, fill the mold cavity, and fuse together to form a foamed structure. Then the foamed structure is cooled to a self-sustaining condition and is removed from the mold as a cup or thin wall article.

Filling the space between the mold cavity and the core with expandable polymeric particles has presented difficulties. Heretofore this space has been filled with particles of expandable polymer through the use of air pressure of vacuum. The molds are in the molding position or closed position for this filling; and as a result, the space between the core and the cavity must be relatively large to insure uniform filling. The spherical characteristic of the particles or beads as they are known in the trade is of great assistance in the charging of the mold with the beads. However, the diameter of the beads which can be used for a given mold space is limited; large beads will not fit.

It has now been found, in accordance with this invention, that the loading of the beads in the mold can be accomplished electrostatically. To this end, an electrical potential difference is applied to one of the mold elements and the element is subjected to an excess of beads whereupon by virtue of the electrostatic attraction between the polymeric beads and the mold element, the beads cling to the element and the element acquires a coating of beads. By adjusting the magnitude of the potential difference, the thickness of the layer of beads can be controlled. The two mold elements are then brought to a closed position and the beads foamed in a conventional manner to produce a foamed structure.

In accordance with a preferred embodiment of the invention, the mold core element is inserted in a reservoir of expandable plastic beads and a potential difference is established between the mold and the reservoir whereby the beads adhere to the core element. Advantageously, the core is rotated at this time to coat the element uniformly. The mold cavity element is then moved to a closed position relative to the core element with the beads adhering to the core element. The mold cavity element, of course, is sufficiently larger than the core to leave a clearance or open space between the two. Heat is then applied to the beads to expand and fuse the beads together to fill the open space between the mold elements and provide a foamed plastic structure of "thin wall" configuration.

The above and further objects and novel features of the invention will appear more fully from the following detailed description when the said is read in connection with the accompanying drawings. It is to be expressly understood, however, that the drawings are not intended as a definition of the invention but are for the purpose of illustration only.

In the drawings wherein like parts are marked alike:

Figure 1:
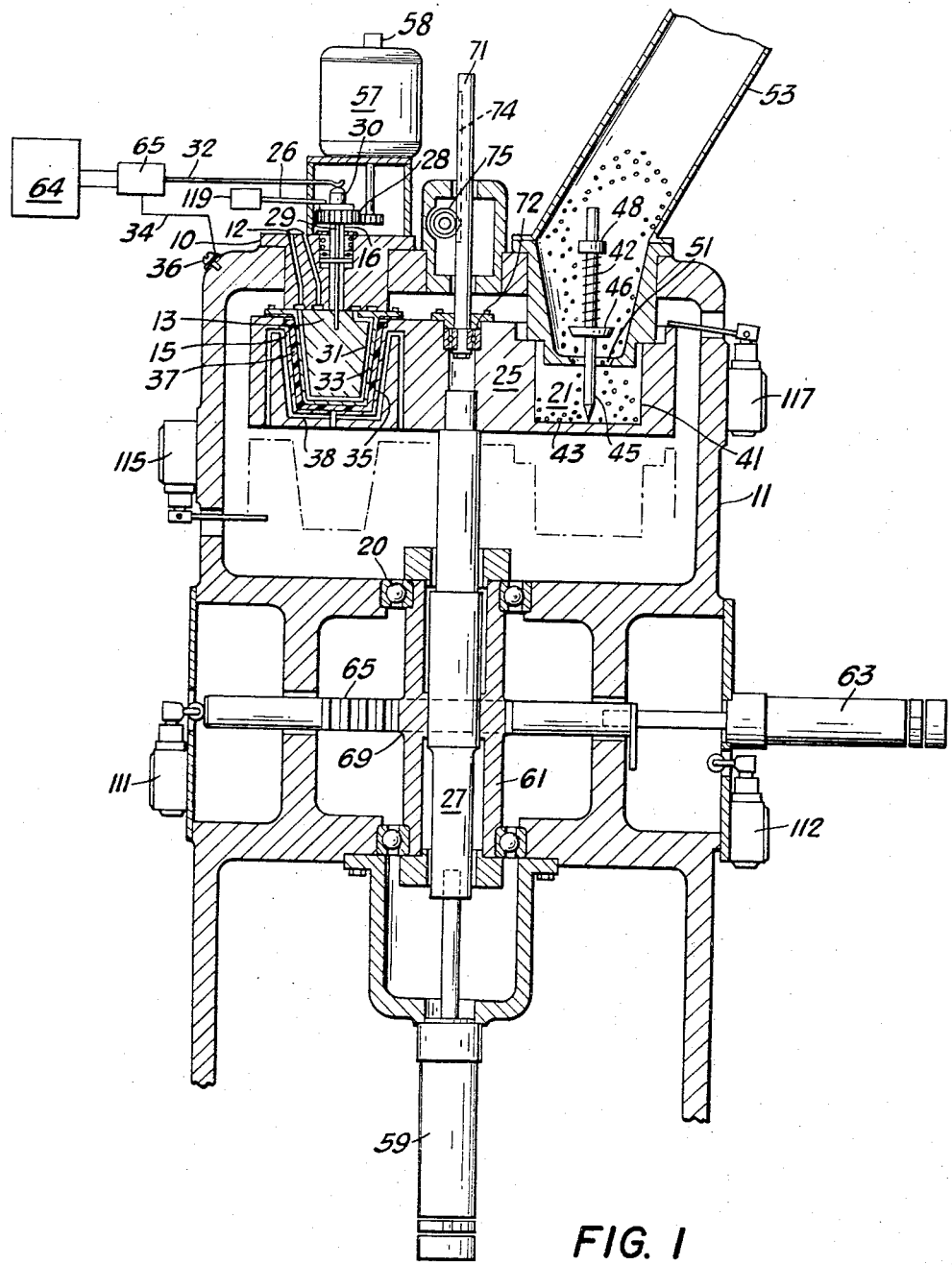
FIGURE 1 is an elevational partial sectional view through the mold and fill stations of an embodiment of the invention.
Figure 3:
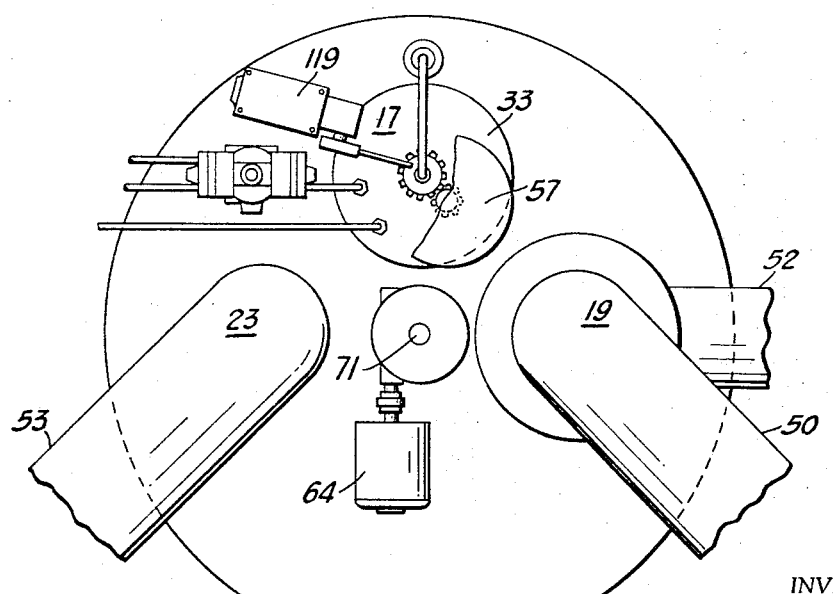
FIGURE 3 is a plan view with portions broken out of FIG. 1.

An embodiment of apparatus for carrying out the invention is illustrated in FIG. 1 as being capable of producing cups from foamed plastic material. The housing or support is provided by a generally circular casting 11. The cover or top of the support includes three stations as illustrated at FIG. 3, molding station 17, discharge station 19, and fill station 23. The mold core element 13 remains at the mold station 17 while the mold cavity element 15 reciprocates vertically relative to the core member from an open to a closed position and rotates from mold station 17 to discharge station 19. The reservoir 21 which supplies a surplus of beads to core member 13 also reciprocates relative to the core member and rotates from fill station 23 where it receives beads to a load position at mold station 17 where it supplies the beads to the core element 13. The mold cavity member 15 and the reservoir 21 are portions of a table 25 which is fixed to shaft 27.

The mold elements 13 and 15 may have conventional heating and cooling features for processing the beads into the foamed structure of a cup. Thus, the core element 13 has interior openings 31 and a conically tapered exterior 33 to mesh with the corresponding tapered seat 35 of the cavity element 15. The cavity element 15, of course, is larger than the core element 13 so that a space 37 exists between the mold element for the beads. This space 37 is in the form of a cup and contains the expandable polymeric beads. The side wall of the housing surrounding the cavity element is provided with interior openings 38 so that air, steam, or water may flow into the chamber from suitable sources through flexible conduits 39. The core element 13 and cavity element 15 may be made of porous metal so that steam and air may easily flow through the sides of the cavity. Thus, steam can move directly through the cavity and core elements and through the open space or chamber containing the expandable beads to heat the beads to expand and fuse them together to form a foamed structure of cup configuration. Thereafter, cooling water is supplied to the molds to cool the foamed structure to a self-supporting condition.

Figure 2:
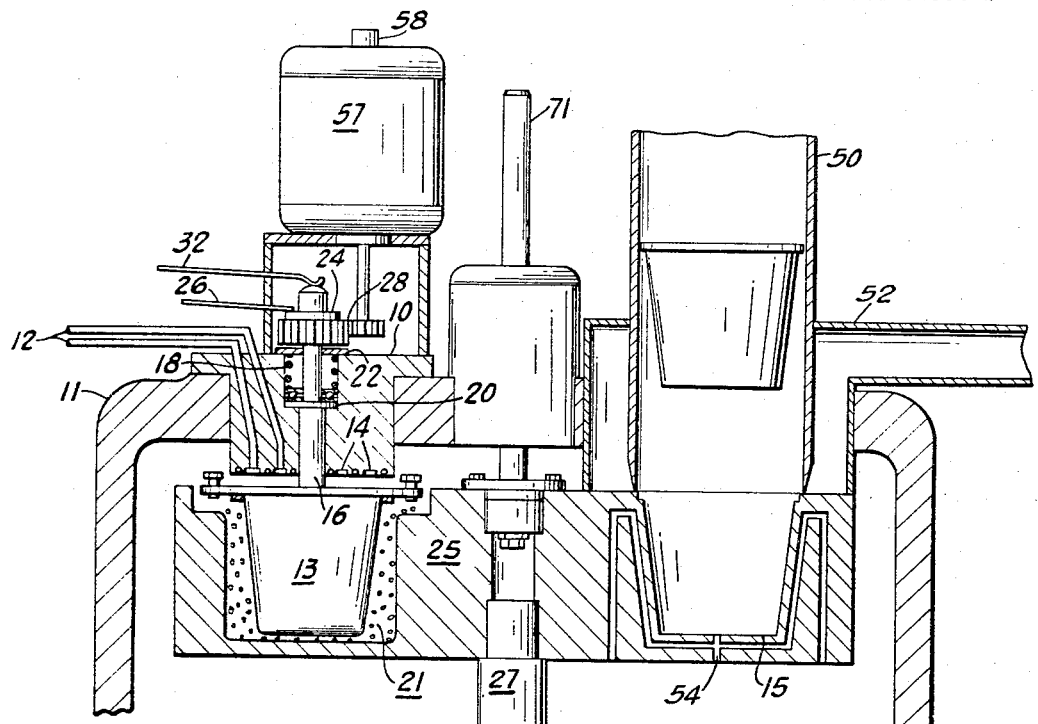
FIGURE 2 is an elevational partial sectional view through the mold and discharge stations of a portion of the embodiment of FIG. 1.

To maintain the core element 13 at mold station 17, a plug 10 is fixed in housing 11. This plug includes inlet and exhaust conduits 12 and header rings 14 for the flow of steam, water, and air through the interior openings 31 of the core element. An insulated rod 16 extends through plug 10 and supports core element 13. A compression spring 18 surrounds rod 16 and is interposed between an abutment 20 on rod 16 and a cover plate 22 secured to plug 10. As illustrated by FIGS. 1 and 2, spring 18 tends to bias core element 13 away from plug 10.

The insulated rod 16 terminates in an abutment 24 which coacts with the finger 26 of a limit switch 119 which senses the vertical position of core element 13 relative to plug 10. Also at this end of rod 16 are a pair of gears 28 driven by motor 57 for revolving the core element 13.

Encapsulated in rod 16 and threaded into core element 13 is a conductive rod 29. An electrostatic charge is applied to terminal 30 of rod 29 by way of contactor 32 from a power supply 65 whose other lead 34 is attached to the frame of support 11 by screw 36. Thus, a potential difference is established between the core element and reservoir 21 via the support 11.

The reservoir 21 has cylindrical sides 41 having a closed bottom 43. With the reservoir at the fill station 23 in a filling position, an indicated in FIG. 1, a pin 45 contacts the bottom 43 of the reservoir and as the reservoir is moved vertically to the position shown is lifted against the bias of a spring 42 which has one end resting on valve unit 46 on pin 45 and the other end bearing against a fixed abutment 48 to move valve 46 from the port 51 to enable expandable beads to flow into the reservoir. A continuous supply of beads at the fill station 25 is provided through conduit 53.

As illustrated, discharge station 19 is comprised of a tube 50 through which the completed cups flow to a suitable packaging machine, and a housing 52 through which scrap particles may be removed by vacuum from a suitable source (not shown). A jet of air through conduit 54 helps release the cup from the mold cavity.

In the sequence of operations a cup is being formed of the beads in the space between mold elements 13 and 15 at mold station 17 during the time the reservoir 21 is being filled with beads at the fill station 23, as illustrated in FIG. 1. Thereafter, table 25 and shaft 27 are lowered vertically to the dotted line position of table 25 whereup the spring 42 biases the valve 49 to close the port 51. The table 25 is then rotated until reservoir 21 is at the mold station 17 and mold element 15 is at the discharge station 19. Table 25 is again raised so that mold element 15 and reservoir 21 are in the position illustrated in FIG. 3. This immerses the core element 13 in the excess of beads in reservoir 21 and at the same time a blast of air sends the cup which has reached the discharge station 19 upwardly through the discharge tube 50 to a packing station (not shown). As the core element is immersed in the reservoir, a potential difference is established across the two and the core is rotated by motor 57. The electrostatic charge on the core causes it to become coated with beads. Thereafter, the table is lowered and rotated back to the position illustrated by the dotted line in FIG. 1 and lifted or raised vertically to the position illustrated in full line in FIG. 1.

In the embodiment illustrated herein, table 25 is supported on shaft 27 and cavity element 15 and reservoir 21 are portions of the table. A conventional pneumatic ram 59 lifts and lowers shaft 27 vertically in sleeve 61. Another pneumatic ram 63 by way of rack 65 and pinion section 69 of sleeve 61 rotates sleeve 61 which is journaled by bearings 71 in support 73. Shaft 27 is splined to sleeve 61 for rotation therewith. Thus shaft 27 is reciprocated and rotated by rams 59 and 63. These rams are controlled through conventional solenoid operated valves by way of conventional conduits (not shown).

Considering the table 25 as a function of its relationship to the core mold element 13, it can be considered to be in a "fill" position when the reservoir 21 is in position to supply beads of expandable polymeric material to element 13. At this time, the table 25 may be elevated in an "up" position or lowered in a "down" position. The table may also be so positioned that the cavity mold element is in position to cooperate with the core mold element to provide the mold space. Again the table may be raised to an "up mold" or lowered to a "down mold" position.

The angular position or relation of table 25 is controlled by conventional limit switches 111 and 112. Limit swtich 111 is closed as the mold elements are in a position to mold a new cap, and switch 112 is closed as the cavity mold element is in a position to discharge a mold cup. The vertical position of table 25 is controlled by conventional limit switches 115 and 117. Switch 115 is closed when table 25 is in the lowered position and switch 117 is closed when the table is in the raised position for discharging a cup or for molding a cup. Switch 119 is closed when the core mold element is in a mold position.

The energization or potential is applied to the core element by way of a variable transformer 64 and power supply 65. Both are conventional. A suitable power supply 65, for example, is Model 9015-5 as sold by Sorenson and Company, Inc. The position of the wipers on the variable transformer is made a function of the position of the table 25. To this end a shaft 71 is supported by bearings 72 in table 25. Shaft 71 includes a rack 74 which coacts with a pinion 75 which by suitable mechanical connections positions the wipers on transformer 64. Thus the energization applied to the core mold element is related to the vertical position of the table 25.

Figure 4:
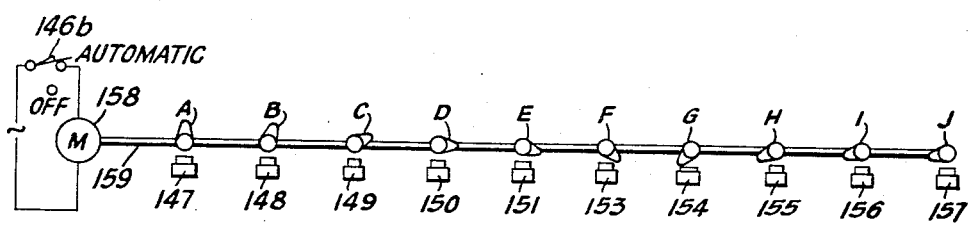
FIGURE 4 is a partially schematic view of a cam actuator for the embodiment of FIG. 1.

The actuation of the foregoing apparatus through a cycle of operation can be conveniently carried out automatically through the use of cams selectively opening and closing various switches. Referring to FIG. 4, the moving of switch arm 146 from the "off" to the "auto" position energizes motor 158 to drive shaft 159. Fixed to shaft 159 is a series of cams which operate sequentially to close and open a series of switches. A typical sequence of operations is as follows: cam A closes switch 147 for a period of about 0.5 second to lift table 25 to supply the polymeric beads to the core element. Cam B closes switch 148 for a period of about 1.5 seconds to apply a high voltage to the core mold element and rotate the element whereby the core element becomes coated with beads. Cam C closes switch 149 for about 0.5 second to lower the table, and then cam D closes switch 150 for about 0.5 second to rotate the mold to bring the cavity mold element in line with the core mold element and the reservoir in line with the fill station. Cam E closes switch 151 for a period of about 0.5 second to raise the table to close the mold elements 13, 15 and refill the reservoir. Cam F closes switch 153 for a period of 5 to 8 seconds to supply steam to the mold element to foam the beads, then cam G closes switch 154 for a period of 5 to 8 seconds to supply water to the mold element to cool the foamed structure, and cam H closes switch 155 for a period of about one second to send air to the mold elements to purge the water therefrom. Cam I closes switch 156 for a period of about 0.5 second to lower the table, and then cam J closes switch 157 for a period of about 0.5 second to rotate the table until the cavity mold element is in line with the discharge chute and the reservoir is in line with the core element. At this time, the motor shaft is in position to repeat the cycle by cam A closing switch 147 to immerse the core element with the beads in the reservoir and to discharge the completed cup from the cavity mold.

Figure 5:
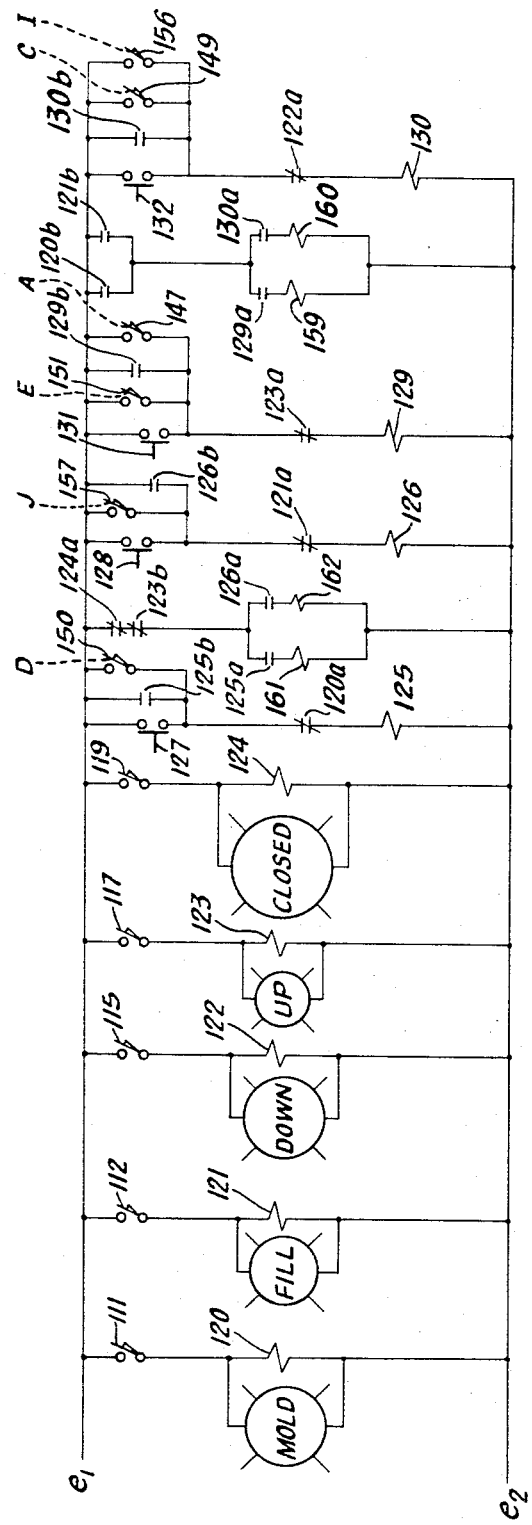
FIGURE 5 is a schematic diagram showing a portion of the control circuit for operating the embodiment of FIG. 1.
Figure 6:
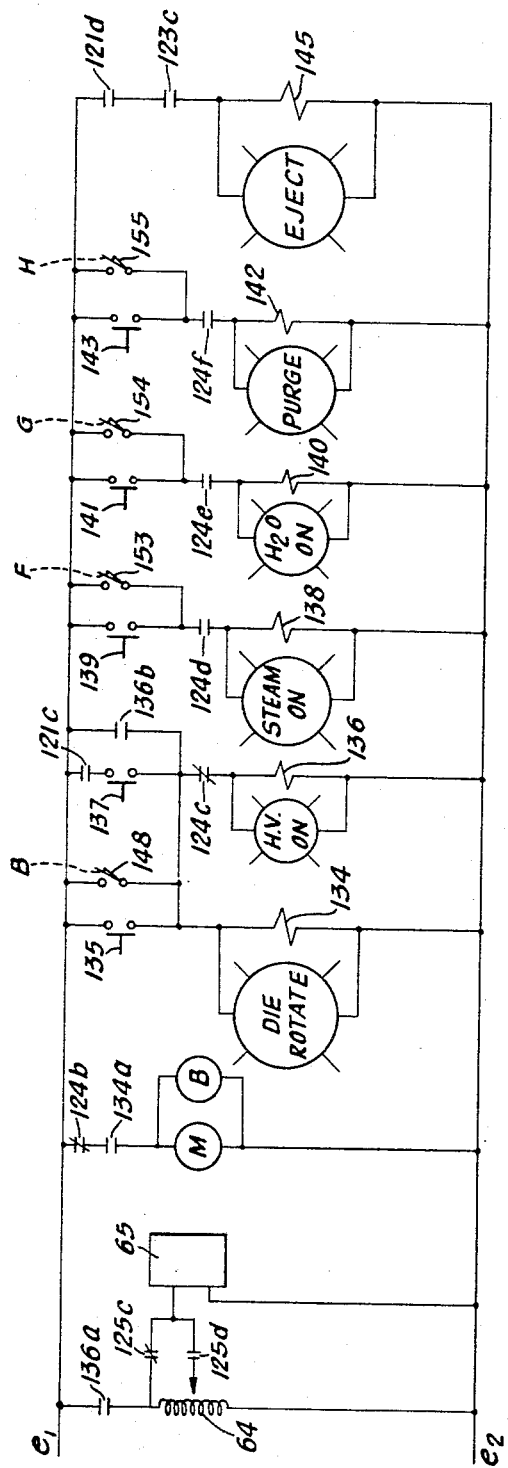
FIGURE 6 is a schematic diagram showing other control circuits for operating the embodiment of FIG. 1.

As illustrated in FIGS. 5 and 6, the various relays, contacts and solenoids are illustrated as being connected between energized bus bars $e_1$ and $e_2$. Turning now to those figures, cam A depresses switch 147 to close the contacts. Relay 129 is energized and contacts 129a operate air solenoid 159 to actuate cylinder 59 and move table 25 upwardly toward the "up fill" position where the table reaches the level shown in FIG. 3. Limit switch 115 opens as table 25 moves from the "down fill" position and relay 122 is de-energized. When the table reaches the "up fill" position, limit switch 117 closes and relay 123 is energized. Normaly closed contacts 123a open to de-energize relay 129 and, in turn, de-energize the air solenoid valve coil 159 to stop the movement of the table 25 upwardly. As is conventional, the contacts that are normally open are illustrated as being open; those that are normally closed are illustrated as being closed and are so indicated by being crossed.

Upon continued rotation of the motor shaft 159, cam A is displaced from switch 147 whereupon the switch 147 opens and cam B closes switch contacts 148, whereupon relays 134 and 136 are energized. Contact 134a closes to energize core element rotation motor 57 whose brake 58 is normally engaged but is automaticaly released whenever the motor is energized. Simultaneously, relay contact 136a closes to energize variable autotransformer 64, thereby energizing the high voltage power supply 65 via contact 125c. Contact 125c effectively bypasses the transformer 64 during the filling operation so that full voltage may be appled to the die even though the table is in a raised or elevated position; but as will be seen later, transformer 64 is effective only in the mold positions.

Further continued rotation of motor shaft 159 causes cam B to release switch 148 and cam C to depress switch 149. Relay 134 is de-energized and contacts 134a open to deactivate core mold rotation motor 57 and brake 58 closes to prevent coasting of the motor. Relay 136 remains energized due to the sealing action of contact 136b. Thus, voltage remains applied to the core mold element 13 so as to retain the beads on its surface by electrostatic attraction. Relay 130 is energized by the closing of switch 149, and contact 130a closes to energize air solenoid valve 160 which supplies air to ram 59 to move table 25 toward the "down fill" position. Limit switch 117 opens as table 25 leaves the "up fill" position and relay 123 is de-energized, and when table 25 reaches the "down fill" position, limit switch 115 closes and relay 122 is energized. Contacts 122a open and relay 130 is de-energized. Contact 130a opens and air solenoid 160 is de-energized.

The subsequent rotation of cam D depresses switch 150 to energize relay 125 whose contacts 125a close to cause air solenoid 161 to open, admitting air to cylinder 63 to rotate table 25 from the "down fill" to the "down mold" position. As table 25 leaves the "down fill" position, limit switch 112 opens, and relay 121 is de-energized. When the table reaches the "down mold" position, limit switch 111 closes and relay 120 is energized to open contacts 120a and de-energize relay 125. The opening of contacts 125a de-energize air solenoid 161. Contact 125c opens and 125d closes, thereby transferring the input connections of power supply 65 from the full power line to the wiper on variable transformer 64. In the lowered position of the table, the wiper is located at the high voltage end of the transformer so that full line voltage is still applied to the input of power supply 65.

Cam E then depresses switch 151 to energize relay 129. Contacts 129a close to energize air solenoid 159. Air is admitted to cylinder 59 and the table 25 moves toward the "up mold" position. As table 25 leaves the "down mold" position, limit switch 115 opens and relays 122 is deenergized. The movement of the table upwardly causes the wiper on variable transformer 64 to move toward the low voltage end of winding to reduce the output voltage of power supply 65 as the cavity mold element 15 approaches the core mold element 13 to nil when the mold elements reach the final molding position. Further motion of the table in the upward direction depresses the spring loaded core mold element until firm physical connections are established by the steam-water connections. As the core mold element 13 becomes fully depressed and steam connections established, limit switch 119 closes, and relay 124 is energized. Contacts 124a and 124b open to lock out table rotation solenoids 161 and 162 and to brake core mold element rotation motor 57. Contacts 124c open, and relay 136 is de-energized whereupon contacts 136a open to deenergize power supply 65. Contacts 124d, 124e and 124f close to provide for the potential energization of the steam, water and purge air solenoid circuits.

At such time table 25 is in the "up mold" position, and limit switch 17 is closed, energizing relay 23. Contact 123a opens and de-energizes relay 129. Contacts 129a open and air solenoid 159 is de-energized.

Cam F depresses switch 153 to energize steam solenoid 138 to admit steam to the mold elements, thereby to heat and foam the beads. Then cam F releases switch 153 and solenoid 138 is de-energized thereby cutting off the steam flow to the dies.

Cam G depresses switch 154, thereby energizing the water control solenoid 140 to allow cooling water to flow through the mold elements.

Cam H depresses switch 155, thereby energizing purging air solenoid 142. Compressed air flows through the mold elements removing entrapped water therefrom.

Cam H releases switch 155 and purging air solenoid 142 closes.

Cam I depresses switch 156 to energize relay 130. Contacts 130a close to energize solenoid valve 160 which admits air to cylinder 59 to lower table 25. As the table leaves the "up mold" position, core mold element 13 returns to its extended position and limit switch 19 opens, de-energizing relay 24. Limit switch 117 also opens as table 25 leaves the "up mold" positioned and relay 123 is de-energized. When the table reaches the "down mold" position, limit switch 115 is closed and relay 122 is energized. Contacts 122a open to de-energize relay 130. Contacts 130a open to de-energize solenoid 160.

Cam J thereafter depresses switch 157 to energize relay 126. The closing of contacts 126a energizes solenoid valve 162. Air is admitted to ram 63 to rotate table 25 toward the "down fill" position. As the table leaves the "down mold" position, switch 111 opens and relay 120 is de-energized and when table 25 reaches the "down fill" position, it depresses limit switch 112 to energize relay 121. Contacts 121a open and relay 126 is de-energized. Contacts 126a open to de-energize air solenoid 162.

As the continued rotation of shaft causes cam J to release switch 157, cam A depresses switch 147. This energizes relay 129. Contacts 129a close to energize air solenoid 159. Air is admitted to ram 59 and moves table 25 upwardly. As the table leaves the "down fill" position, limit switch 115 opens and relay 122 is de-energized. Upon reaching the "up fill" position, limit switch 117 closes and relay 123 is energized. Contacts 123a open and relay 129 is de-energized. Contacts 129a open to de-energize air solenoid 159. Contacts 123c close and air solenoid 145 is energized to admit air to the cavity mold element which contains the previously molded cup to eject the cup into a receiver chute. The cycle then continues as previously described.

In order that each of the foregoing operations may be performed manually if desired there are provided push button type bridging contacts 127, 128, 131, 132, 135, 137, 139, 141 and 143.

Figure 7:
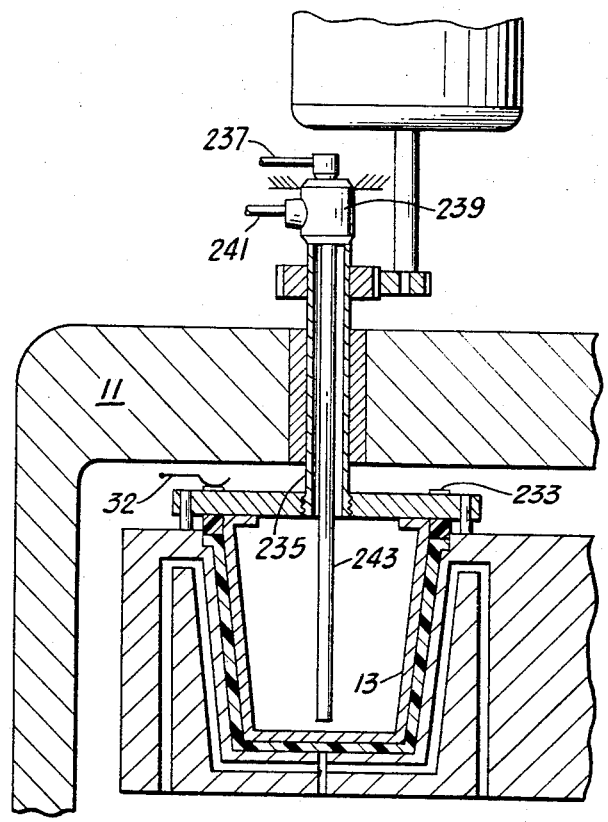
FIGURE 7 illustrates another embodiment of the mold elements of FIG. 1.

FIGURE 7 illustrates another embodiment of arrangement for the core mold element. The plug and spring arrangement of FIGURES 1 and 2 have been replaced by a bearing arrangement 201 to permit the mold to revolve in support 11. Contactor 32 rides then on a circular bushing 233 to provide the electrical charge to core element 13. The core element 13 is suspended by tubing 235. Steam, water and air enter through inlet 237 to header 239 and exhaust through exit 241. Tube 243 provides for the separation of the fluid until it reaches the lower portion of mold element 13.

I claim:

1. Apparatus for expanding and fusing expandable bead-like thermoplastic materials into self-sustaining articles comprising
complementary core and cavity mold elements adapted, when closed, to define a molding space therebetween,
means for applying an electrical potential to said core mold element, means for contacting said core mold element with a surplus of beads to coat the wall of the core with adhering beads, means for closing said mold, and means for subjecting the beads retained on said core mold element to heat whereupon said beads expand and fuse together to form a foamed structure corresponding to the configuration of the space between said mold elements.

2. Apparatus for molding expandable thermoplastic article, comprising a core element, a bead reservoir adapted to hold beads, means for immersing said core mold element in the reservoir, means for establishing a potential difference between said core mold element and said reservoir to adhere beads to said core element, means for removing said core mold element from said reservoir, a cavity mold element, means for moving said core mold element and said cavity element together to a closed position to form a cup-shaped mold space, and means for heating said mold elements to expand and fuse said beads in said mold space to form a cup.

3. The apparatus of claim 2 including means to lower the potential as the core and cavity elements approach their closed position.

4. The apparatus of claim 3 including means to rotate the core mold element while it is immersed in said reservoir.

5. The apparatus of claim 4 including means to move said reservoir from a filling position for receiving beads to a loading position for immersion of said core mold therein.

6. The apparatus of claim 4 including means to move the cavity element from a molding position in cooperation with said core element to a discharge position where the fused article is discharged from said cavity element.

7. Apparatus for producing articles from expandable thermoplastic beads comprising, a support, a molding station, a filling station, and a discharging station of said support, a table mounted on said suport for rotation relative thereto, a reservoir and a mold cavity element on said table in spaced relationship, a core mold element at said molding station for cooperation with said cavity element to form a molding space for forming a foamed plastic article, means at said filling station for filling said reservoir with said thermoplastic beads, means at said discharging station for receiving the foamed article from said cavity element, means for rotating said reservoir from said filling station to said molding station and said cavity element from said molding station to said discharging station, and means for applying an electrical potential to said core element whereby beads from said reservoir adhere to said core element.

8. Apparatus for producing articles from expandable thermoplastic particles comprising, a core mold element, a cavity mold element, said core and cavity mold elements when in a closed position providing a mold space, means for moving said cavity and core elements to a closed position and away from said closed position to an open position, electrical means to adhere said thermoplastic particles to said core by electrostatic attraction while the mold elements are in an open position, and means to heat said beads while said elements are in a closed position.

References Cited

UNITED STATES PATENTS

| 3,129,464 | 4/1964 | Heider | 18—5 X |
| 3,193,874 | 7/1965 | Jablonski | 18—5 X |
| 3,217,362 | 11/1965 | Jacobs | 18—5 X |

WILBUR L. McBAY, *Primary Examiner.*